United States Patent [19]

Perry et al.

[11] Patent Number: 5,398,923
[45] Date of Patent: Mar. 21, 1995

[54] ONE-WAY WINCH BRAKE

[75] Inventors: Charles H. Perry, Putnam; Robert G. Nelson, Thompson, both of Conn.

[73] Assignee: Superwinch, Inc., Putnam, Conn.

[21] Appl. No.: 58,294

[22] Filed: May 6, 1993

[51] Int. Cl.⁶ .................... B66D 5/02; B66D 5/14; B66D 1/22; F16D 51/00
[52] U.S. Cl. .................. 254/375; 254/378; 254/344; 188/323
[58] Field of Search .............. 254/375, 378, 344; 188/71.2, 82.3, 82.1, 323

[56] References Cited

U.S. PATENT DOCUMENTS

| | | | |
|---|---|---|---|
| 838,024 | 12/1906 | Hendricks | 188/82.3 |
| 1,380,134 | 5/1921 | Cook | |
| 1,921,719 | 8/1933 | Allen | |
| 2,309,597 | 1/1943 | Kacic | |
| 2,489,688 | 11/1949 | Vitoux | |
| 2,534,133 | 8/1946 | Kirkpatrick | |
| 3,333,821 | 8/1967 | Pohl et al. | |
| 3,554,337 | 1/1991 | Denkowski | 188/82.1 X |
| 4,119,299 | 10/1978 | Dietrich et al. | 254/378 |
| 4,461,460 | 7/1984 | Telford | 254/378 X |
| 4,545,567 | 10/1985 | Telford et al. | 254/378 X |
| 4,553,869 | 11/1985 | Alexander et al. | 188/82.1 X |
| 4,601,370 | 7/1986 | Papadopoulos | 254/378 X |
| 5,261,646 | 11/1993 | Telford | 254/375 |

FOREIGN PATENT DOCUMENTS 117067 1/1918 United Kingdom.
220374 3/1924 United Kingdom.

*Primary Examiner*—Daniel P. Stodola
*Assistant Examiner*—Michael R. Mansen
*Attorney, Agent, or Firm*—Hayes & Reinsmith

[57] ABSTRACT

A power operated drive shaft and brake assembly are coaxially mounted for rotation inside a cable drum which is coupled to the drive shaft through gearing. The brake assembly has an adapter housing and one-way clutch for drivingly connecting the drive shaft and adapter housing during a "cable out" operation. A plurality of brake pads are mounted for movement relative to the brake adapter housing. The brake pads are angularly offset in a non-radial orientation to negate undesired brake drag caused by centrifugal forces while the pads are spring loaded to provide a predetermined braking force to hold a load in place after completion of a winching operation.

19 Claims, 5 Drawing Sheets

ONE-WAY WINCH BRAKE

FIELD OF THE INVENTION

This invention relates to a braking device for winches, particularly for winches used for paying out cables and which are required to stop and hold a load in place after the winching operation is completed.

BACKGROUND OF THE INVENTION

Certain winch designs have a basic requirement for a brake. The winch must be able to hold a load in place after the winching operation is completed. An important factor in designing such a unit is cost. Such a design might ideally incorporate a brake which would not react to centrifugal forces and therefore would not react to changes in motor speed. Simple disc brakes will accomplish that purpose. However, disc brakes are not compatible with a low-cost, compact winch unit intended for use in a variety of applications.

For maximum convenience and cost effectiveness, a brake housed inside a cable drum is particularly advantageous. A disadvantage of such an arrangement is that conventional approaches normally involve use of a brake which presents a centrifugal force problem. More specifically, a brake could be used with a one-way clutch so that the brake acts only in a cable out direction and with proper design a load can be held at rest. However, when a motor is powered in reverse for paying out cable, centrifugal forces normally fling brake pads outwardly, increasing the brake drag. As the motor speed increases, the drag increases as the square of the motor speed. Extra drag causes the drum to overheat excessively, the motor lugs down and runs too slowly and wastes far too much power which in turn produces considerable heat and unacceptable wear and tear on the components.

SUMMARY OF THE INVENTION

To overcome the above-described problems, a brake is provided with a one-way clutch, and a motor-operated drive shaft rides in the clutch for driving a drum through suitable gearing. The brake includes a cylindrical adapter housing which with the drive shaft is coaxially aligned and concentrically mounted within the drum. The housing has a plurality of spring-loaded brake pads mounted on the housing in a non-radial orientation for sliding movement into engagement with an interior cylindrical portion of the drum. The housing defines a path of brake pad movement which is oriented other than in a radial direction to provide a controlled drag on the drum and to effect a predetermined retarding force on the drive shaft, which otherwise would be backdriven by the drum under load through the gearing, and is capable of holding a given load while negating the normally undesirable effects of centrifugal force due to the rotational speed of the brake assembly.

Other objects will be in part obvious and in part pointed out more in detail hereinafter.

A better understanding of this invention will be obtained from the following detailed description and accompanying drawings of illustrative applications of the invention.

DETAILED DESCRIPTION OF THE DIFFERENT EMBODIMENTS OF THE INVENTION

Figure 1:
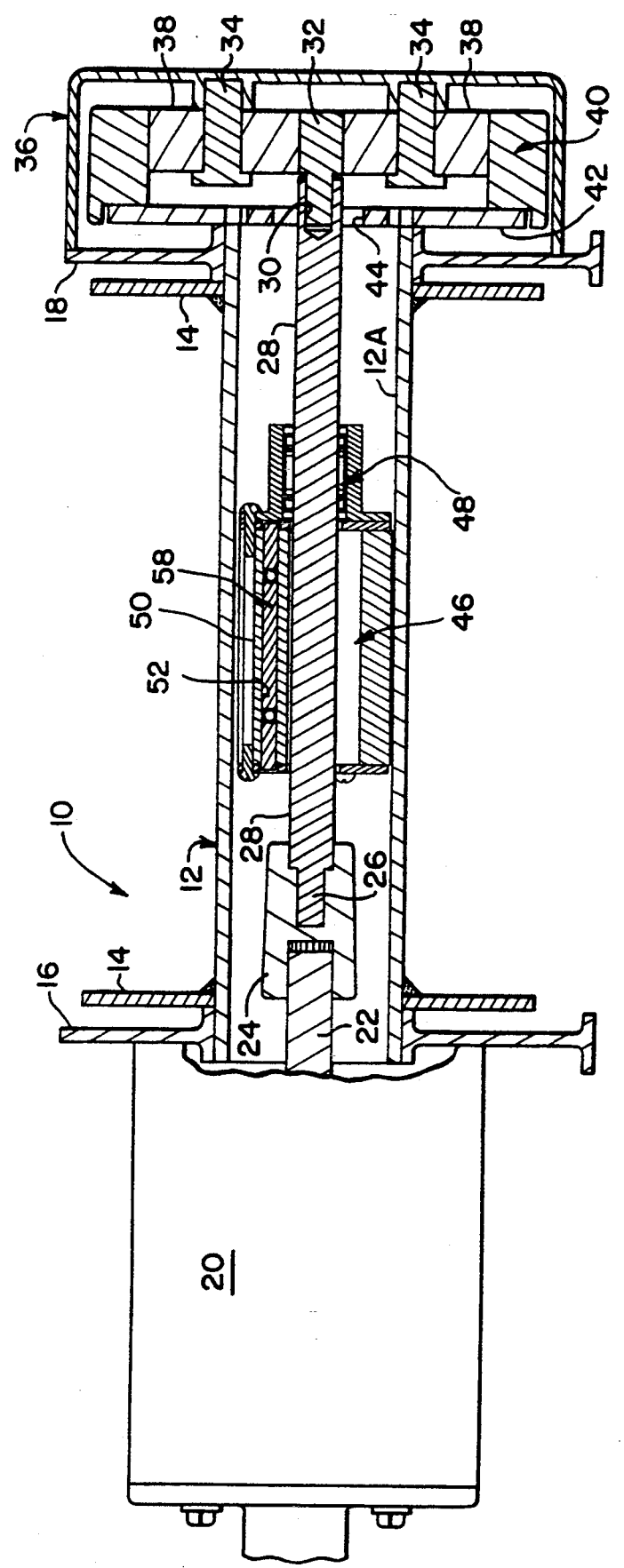
FIG. 1 is a side view, partly broken away and partly in section, illustrating a winch incorporating this invention.

Referring now to the drawings in detail, a winch 10 is shown in FIG. 1 which includes a cable drum 12 having a pair of flanges 14, 14 adjacent its opposite ends and mounted for rotation on a pair of drum supports 16, 18 which provide the drum 12 bearing support. A reversible electric motor 20 is attached to drum support 16. That motor 20 has a motor armature shaft 22 to be connected to a drive shaft coupling 24 which received a tang 26 on one end of a drive shaft 28 fitted into the drive shaft coupling 24. An opposite end of the drive shaft 28 has a hole 30 into which a pinion gear 32 is pressed. In the illustrated embodiment, a pair of bearing pins 34, 34 are shown affixed to a gear box housing 36 and supporting power takeoff gears 38, 38 which are in meshing engagement with both pinion gear 32 and a rotating ring gear 40 affixed to a drum drive plate 42 suitably secured to drum 12. Drum drive plate 42 has a central opening 44 allowing the drive shaft 28 and pinion 32 to pass through.

Rotation of the motor armature shaft 22 in a given angular direction effects rotary movement of drum 12 through the gearing. When there is a load on the winch cable, not shown, the drum 12 tends to turn and backdrive through the gearing which in turn makes the drive shaft 28 backup. As will be readily understood, without some retarding force on the drive shaft 28, the winch 10 then will not hold a load. As previously explained, certain winches having conventional centrifugally operated brake assemblies providing that retarding force on the drive shaft are known to become quickly overheated and to draw down high amperage upon the motor lugging down and eventually actually running too slowly when a winch is reversed to pay out cable.

In the illustrative embodiment, when motor armature shaft 22 is turned in one direction for paying out cable in a so-called "cable out" mode of operation, a brake assembly 46 of this invention cooperates with a one-way clutch 48 to provide a controlled drag on drum 12 and effect a predetermined retarding force on drive shaft 28. When the motor is operated in reverse to turn the motor armature shaft 22 in the opposite direction, drum 12 rotates to effect a "cable in" mode of operation, and the one-way clutch 48 permits the winch forward or "cable in" mode to be effected without any drag.

Figure 3:
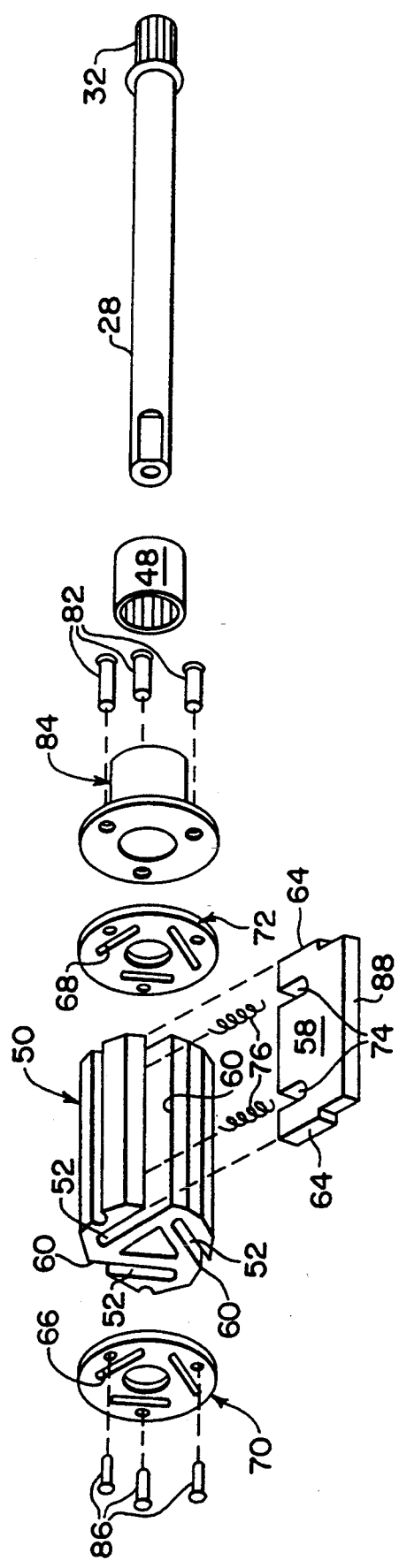
FIG. 3 is a reduced, exploded view showing certain components of the brake of FIG. 2 in disassembled relation.

More specifically, to minimize desired brake drag to only that which is required to hold a desired load in accordance with this invention, a generally cylindrical brake adapter housing 50 is designed to provide a plurality of brake pad slots 52, 52, 52, (FIG. 3) formed within the housing 50 and oriented at an angle which is offset from a radial projection 54 (FIG. 4) from a major rotational axis such as at 56 about which the drive shaft 28, housing 50 and drum 12 turn. The adapter housing 50 may be an aluminum extrusion designed to hold brake pads 58, 58, 58 in a predetermined angular orientation to reduce centrifugal forces and negate undesirable effects from those forces. In the subject embodiment, the adapter housing 50 is shown with three equiangularly disposed slots 52, 52, 52 each of which terminate in an exit opening 60, 60, 60 formed in the surface of the adapter housing 50 (FIG. 3) and which extend into the confines of the adapter housing 50 at an angular orientation uniformly offset from a radial plane containing the exit opening 60 of each slot 52 and the major rotational axis 56 of the adapter housing 50. The exit openings 60, 60, 60 (FIG. 4) are equally spaced apart at 120° about the circumference of the adapter housing 50.

Figure 2:
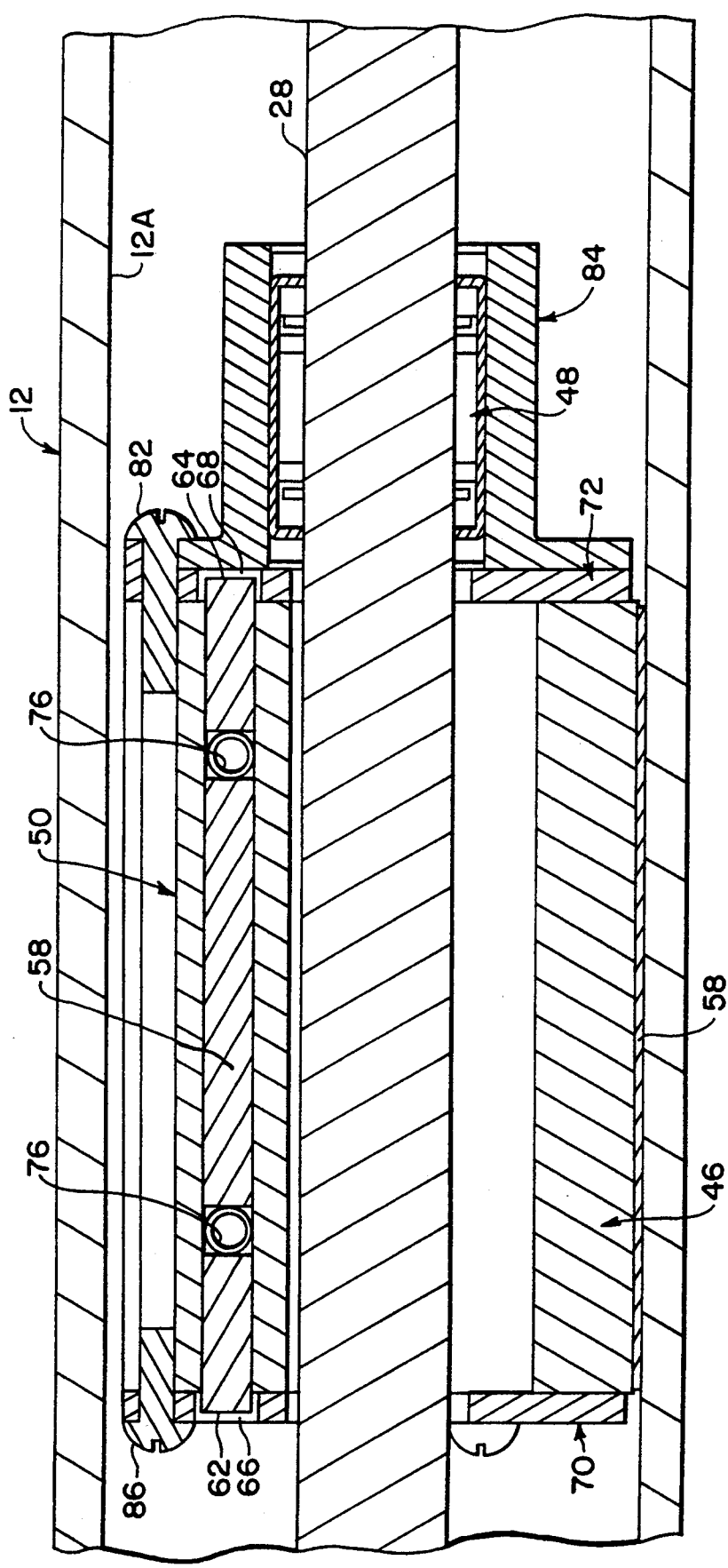
FIG. 2 is a enlarged side view, partly broken away and partly in section, showing a winch brake of this invention.

A brake pad 58 (best seen in FIG. 3) is fitted into each of the brake pad slots 52 which effectively serve as guide means for the brake pads. In the embodiment illustrated in FIGS. 3 and 4, the brake pad 58 has a generally rectangular configuration with opposite sides of each pad having projecting ears 62, 64 extending in opposite directions and dimensioned to extend beyond the ends of the adapter housing 50 (FIG. 2) to be received within elongated registering apertures such as at 66, 68 formed in circular pad retainers 70, 72 secured on opposite ends of the adapter housing 50. The elongated apertures 66, 68 on the pad retainers 70, 72 are of greater length than that of the ears 62, 64 of the brake pads 58 to permit limited movement of each brake pad within its adapter housing relative to the pad retainers. The brake pads 58 are each provided with a pair of interior cutouts 74, 74 for receiving and capturing a pair of compression springs 76, 76 within the housing 50, the springs serving to urge its respective pad continuously outwardly toward its operative position in engagement with a portion of the cylindrical interior wall 12A of the drum 12.

While the described embodiment discloses the brake pads acting directly on the cable drum 12, this invention contemplates a brake assembly of the described type which is capable of retarding drive shaft rotation by acting upon any suitable interior drum surface which, in the embodiment of FIGS. 1-4, is specifically shown as the interior wall 12A of the cable drum 12.

Figure 4:
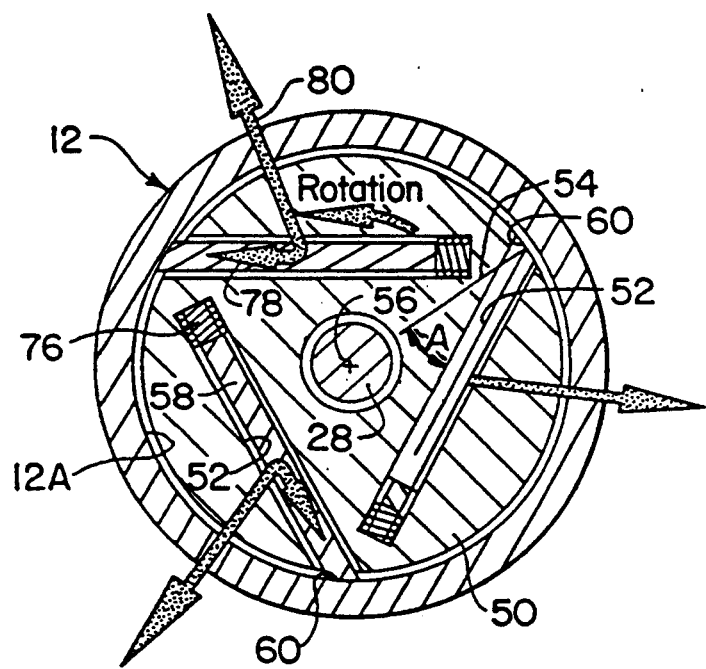
FIG. 4 is a cross-sectional schematic view showing the brake of this invention inside a cable drum.

By virtue of this disclosed structure, brake pad movement accordingly is not in a radial direction but rather is at an offset angle of "action" or angle of "tilt" as best illustrated in FIG. 4. Accordingly, a brake drag force vector illustrated at 78 and causing added brake drag is significantly reduced to a predetermined desirable level as readily seen when compared to the vector shown at 80 representative of a centrifugal force in a radial direction which is now applied to the housing 50 rather than to the pad 58 and drum 12 and which would otherwise result in an undesired and excessive brake drag on the drum.

Suitable fasteners such as the illustrated panhead tapping screws shown at 82 may be used to jointly attach the brake drive coupling 84, which houses the roller clutch bearing 48, and the pad retainer 72 directly to one end of the adapter housing 50. At the opposite end of the adapter housing 50, similar panhead tapping screws such as at 86 may be used to secure the other pad retainer 70 in position on the adapter housing 50. The pad retainers 70, 72 are preferably molded from a suitable material such as nylon for maintaining the pads within the housing with the brake pad ears 62, 64 in proper position for guiding reciprocating translational movement of each brake pad 58 within its respective slot 52.

The brake pads 58 may be made of a molded non-asbestos semi-metallic friction material. The pad coefficient of friction may be about 0.33 and the resistance to high temperatures of each pad is such that it preferably will withstand temperatures up to about 700° Fahrenheit. To match the interior wall 12A of the drum 12, it has been found that the front face 88 of each pad 58 may be cut on about a 53° angle to provide a matching beveled configuration.

To provide a winch 10 with a pulling capacity of, say, 9,000 pounds and to design that winch with a holding capacity, say, of 4,500 pounds on the first layer of cable, a 12 volt 2 horsepower series wound motor such as Wapsa Auto-Pecas Ltd. w 130 442 000 has been found to work satisfactorily in connection with suitable planetary gearing, not shown. The drive shaft 28 may be made of 86L20 cold rolled steel carburized, hardened and drawn to a hardness of RC-58 with an outside diameter machined to 0.6245 inches to ride inside the one-way roller bearing clutch 48 of the brake assembly 46. The roller bearing clutch 48 may be provided with an outside diameter of 0.875 inches and inside diameter of 0.625 inches, and a width of one inch having a limiting speed of 8500 rpm. The load rating of the bearing is 1,070 pound force dynamic and 817 pound force static with a torque rating of 143 inch pounds. A suitable bearing of this general type may be obtained from The Torrington Company, part number RCB-101416-FS. The brake drive coupling 84 housing the roller bearing clutch 48, may be a powdered metal component that has a 7.0 g/cc minimum density and a minimum tensile strength of 60,000 PSI.

In the specifically illustrated embodiment of FIG. 4, the "angle of tilt" of the brake pads 58 is that depicted angle "A" which is subtended by the brake pad slot 52 and a radial projection 54 extending between exit opening 60 and the major rotational axis 56 of the housing 50. In the specifically illustrated embodiment, the "angle of tilt" is about 40 degrees and this has been found to work satisfactorily for the above described winch with a pulling capacity of 9,000 pounds and a holding capacity of 4,500 pounds.

As will be recognized, when the drive shaft 28 is either at rest or rotating, the brake pads 58 are engaged with the interior drum wall 12A (FIG. 2), for the drag imposed under the continuous force exerted on the pads 58 on the drum 12 by the resilient loading of the compression springs 76, 76 must be capable of holding a given load when a winching operation is completed. When the motor is energized to rotate the drive shaft 28 to effect "cable out" operation, the one-way roller bearing clutch 48 is automatically activated to effect synchronous rotation of the brake assembly 46 via the brake drive coupling 84. As motor speed increases, the centrifugal action effected causes an added force to that normally exerted by the springs 76, 76 on each of the brake pads 58 to urge them outwardly in unison relative to the adapter housing 50; as the speed of the motor further increases, the brake pads 58 are continuously acted upon to be urged uniformly outwardly by the joint action of the springs 76, 76 and drag force component such as at 78 (FIG. 4) to act on the interior wall 12A of the drum 12 and to press the pads 58 more firmly into engagement with the drum to effect a controlled braking drag without unacceptable heat buildup or undue motor lugging due to excessive centrifugal forces acting on the brake pads 58.

When the motor is reversed to effect a "cable in" mode of operation, the springs 76, 76 maintain their respective pads 58 in engagement with the drum 12 such that the adapter housing 50 and the pads 58 carded thereby rotate in unison with the drum while the one-way roller clutch bearing 48 permits the drive shaft 28 to rotate relative to the brake assembly 46.

Figure 5:
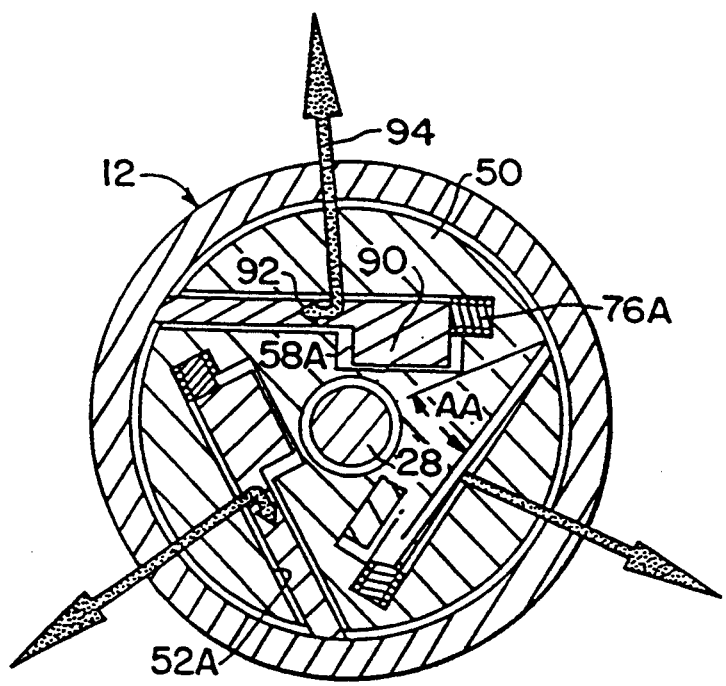
FIG. 5 is a view similar to FIG. 4 showing another embodiment of the brake of this invention.

An alternative approach in refining the amount of supplemental action to be applied in the way of a drag force to the pads in addition to the loading normally effected by the springs 76, 76 is to control the location of the center of gravity of the sliding brake pads 58 as well as the above described angle "A" of action or tilt. Were more mass added to the brake pads 58A, e.g., on an end of the brake pad such as at 90 (FIG. 5) adjacent their respective brake pad springs 76A, a resultant of the centrifugal force can be further negated so that as the motor speeds up, the vector such as at 92 representing brake drag force is further reduced relative to that at 78 in the previously described embodiment of FIG. 4. Vector 94 depicts the centrifugal force imposed on the brake pads 58A by increased motor speed and which is now applied to the adapter housing 50 in view of the disclosed orientation of the brake pad slots 52A at the angle "AA" of tilt in FIG. 5.

Figure 6:
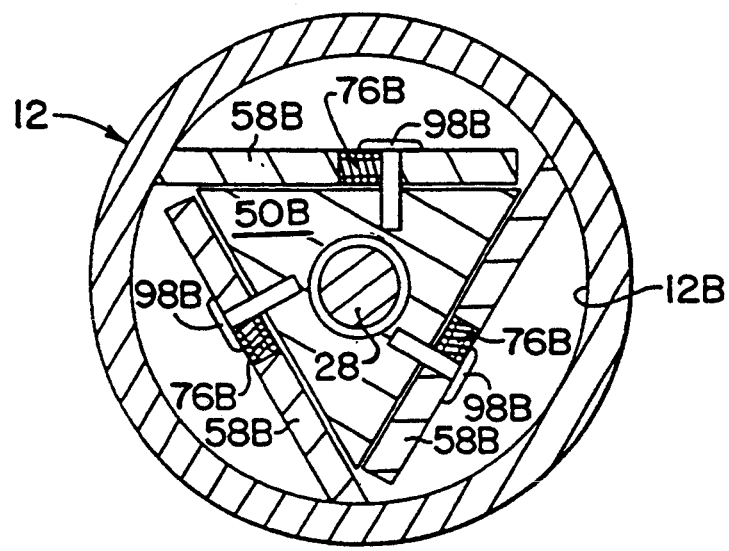
FIG. 6 is a view similar to FIG. 4 showing yet another embodiment of the brake of this invention.

Referring now to FIG. 6, yet another embodiment of this invention is depicted wherein a housing 50B is illustrated having a generally triangular cross-section which will be understood to be supported as previously described in connection with the first embodiment on the drive shaft, not shown. Exterior surfaces of the housing 50B each serve as guide means in cooperation with the illustrated fasteners 98B for maintaining the brake pads 58B in a predetermined angular relation as described above. Spring 76B continuously bias their respective pads 58B into direct engagement with the interior wall 12B of the drum 12.

Figure 7:
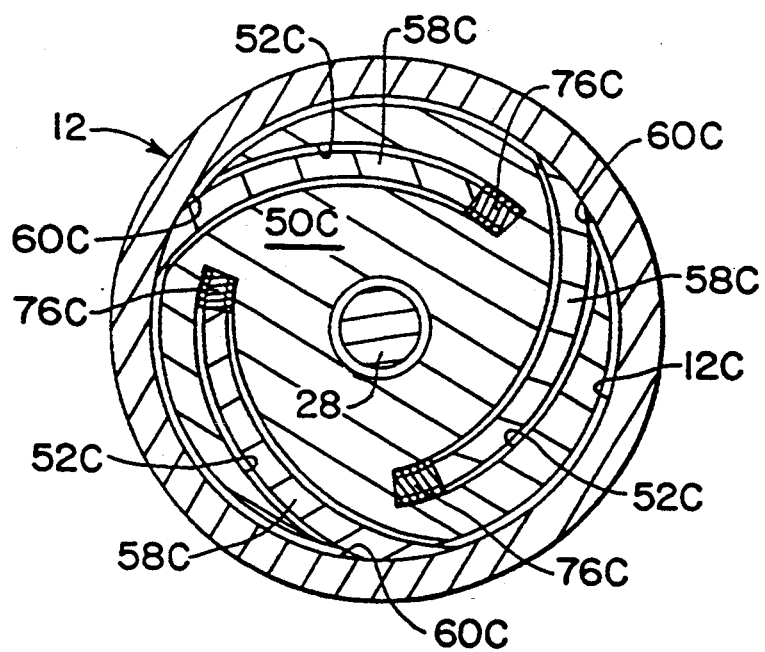
FIG. 7 is a view similar to FIG. 4 showing a further embodiment of the brake of this invention.

In FIG. 7, yet another embodiment is illustrated of this invention wherein arcuate slots 52C are formed within the confines of the housing 50C with each of the slots 52C terminating at exit openings 60C which will be understood to extend in parallel relation to the major rotational axis of the housing 50C. The exit openings 60C are equally spaced apart from adjacent exit openings about the circumference of the housing. The arcuate brake pads 58C are each continuously urged into engagement with the interior drum wall 12C by suitable springs 76C as fully described in the previous embodiments.

Testing of a conventional brake winch of the type described rated for 9,000 pounds pulling capacity and designed to hold a 4,500 pound load resulted in about 250 motor amperes with the motor operating in reverse and the cable running in a "cable out" mode of operation. The surface temperature of the drum exceeded 600° F. at 2,000 to 3,000 rpm in such a brake utilizing a conventional radially oriented series of pads effecting significant concentric forces. Testing of a brake winch incorporating this invention with the spring-loaded brake pads mounted on the housing in a non-radial orientation as featured in this invention dropped the power consumption to 150 motor amperes with the motor running in reverse in a "cable out" mode, dropped the surface temperature of the drum to about 350° F. while the motor speed was observed at about 4,500 rpm.

By virtue of this disclosed invention, significant cost effectiveness and efficiency within a compact envelope is provided by the disclosed design which features a unique brake assembly configured to operate on the inside of the drum. Conventionally excessive centrifugal forces are negated by changing the described angle of action or "tilt" and/or by changing the location of the center of gravity of the brake pads.

Although this invention has been illustrated and described with respect to exemplary embodiments thereof, it should be understood by those skilled in the art that various changes, omissions and additions may be made without departing from the spirit and scope of the invention.

We claim:

1. A winch brake for maintaining a cabled load in place after completion of a winching operation and comprising
   (a) a drum having a cylindrical interior wall,
   (b) a drive shaft, and
   (c) a brake assembly mounted for rotation inside the drum and selectively drivingly coupled to the drive shaft, the brake assembly including
      (i) brake pad means for effecting a drag on the drum interior wall,
      (ii) spring means for continuously urging the brake pad means into engagement with the drum interior wall, and
      (iii) an adapter housing mounting the brake pad means relative to the drum interior wall, the housing having guide means therein including an exit opening on an outer surface of the housing for maintaining the brake pad means in a predetermined angularly offset relation to a radial projection extending from a major rotational axis of the housing.

2. The brake of claim 1 wherein the drive shaft is supported within the drum for rotation about said major rotational axis, wherein the drive shaft is drivingly connected to the drum, wherein a one-way clutch is mounted in coaxial relation to the drive shaft, and wherein the brake assembly is drivingly coupled to the drive shaft in only one angular direction through the one-way clutch for applying a drag braking force to the drive shaft in a "cable out" mode of operation.

3. The brake of claim 1 wherein the brake pad means comprises a plurality of pads each including a beveled face for matching contact engagement with the interior wall of the drum.

4. The brake of claim 1 wherein the spring means applies a drag braking force on the pad means after completion of a winching operation to maintain said load in place.

5. The brake of claim 1 wherein the housing guide means comprises slot means therein for providing directional control of the brake pad means and terminating in the exit opening on an outer surface of the housing, the slot means being formed at said predetermined angularly offset relation to a radial projection extending between said major rotational axis of the housing and said exit opening.

6. The brake of claim 5 wherein the exit opening extends in parallel relation to the major rotational axis of the housing, and wherein the slot means is in angularly offset relation to said radial projection.

7. The brake of claim 6 wherein the slot means formed in the housing is contained in a plane extending at a predetermined angle relative to a plane containing the major rotational axis of the housing and said exit opening, and wherein a change in said predetermined angle provides a concomitant change in the amount of drag braking force applied by the brake pad means to the drum in addition to the biasing force applied thereto by the spring means.

8. The brake of claim 6 wherein the brake pad means comprises a generally rectangular member having opposed side edges with a pair of ears projecting in opposite directions therefrom, and wherein a pad retainer is mounted on each of the opposed ends of the brake adapter housing, the pad retainers each having aperture means formed therein corresponding to the slot means in the housing for receiving the ears of the brake pad, the length of the pad retainer aperture means being longer than the length of the brake pad ears to permit a predetermined amount of brake pad means movement relative to the pad retainers.

9. The brake of claim 8 further including a reversible motor for rotating the drive shaft in a selected angular directions, and a driving connection between the drive shaft and the drum including reduction gearing means interconnecting the drive shaft and the drum whereby the drum rotates at a reduced angular speed relative to the drive shaft.

10. The brake of claim 1 wherein the brake pad means comprises a plurality of pads each having a generally rectilinear cross-section of uniform configuration.

11. The brake of claim 1 wherein the brake pad means comprises a plurality of pads each having a non-uniform cross-section configured with an enlarged portion providing added mass for reducing the effect of undesired brake drag caused by centrifugal forces.

12. The brake of claim 1 wherein the brake pad means comprises a plurality of pads each having a drum-engaging friction end and a pad portion disposed in remote relation to its friction end, the pad portion being of increased density relative to the friction end of the pad for reducing the effect of undesired brake drag caused by centrifugal forces.

13. The brake of claim 1 wherein said drum is a power operated cable drum.

14. A winch brake for stopping and holding a load in place after completion of a winching operation and comprising (a) a cable drum having a cylindrical interior wall,
(b) a drive shaft coaxially mounted inside the drum,
(c) a brake assembly including
  (i) a plurality of brake pads for effecting a drag on the drum interior wall,
  (ii) spring means for continuously urging the brake pads into engagement with the drum interior wall, and
  (iii) a generally cylindrical housing having a plurality of slots therein for receiving and orienting the brake pads, the slots each terminating in an exit opening on an outer surface of the housing, the exit opening extending in parallel relation to a major rotational axis of the housing, each of the slots being formed in a predetermined angularly offset relation to a radial plane extending between the exit opening and the major rotational axis of the housing, and
(e) a one-way clutch between the brake housing and the drive shaft for drivingly connecting the brake assembly and the drive shaft in a "cable out" mode of operation while permitting relative rotation therebetween in a "cable in" mode of operation.

15. The brake of claim 14 wherein the brake pads each have a generally rectilinear cross-section of uniform configuration.

16. The brake of claim 14 wherein the brake pads each have a cross-section configured with an enlarged portion providing added mass for reducing the effect of undesired brake drag caused by centrifugal forces.

17. The brake of claim 14 wherein the brake pads each have a portion of relatively increased density for reducing the effect of undesired brake drag used by centrifugal forces.

18. The brake of claim 14 wherein the slots in the housing are each offset at a common angle relative to said radial plane extending between its respective exit opening and the major rotational axis of the housing, and wherein adjacent slots are equally spaced apart about the circumference of the housing.

19. The brake of claim 14 further including a drive shaft the one-way clutch providing rotary support for the brake housing on the drive shaft, support means for rotatably supporting the drive shaft and the drum in concentric relation about the drive shaft, a reversible motor for rotating the drive shaft in a selected angular direction, and gear reduction means interconnecting the drive shaft and the drum, whereby the drum rotates at reduced angular speed relative to that of the drive shaft.

* * * * *